United States Patent Office 3,479,247
Patented Nov. 18, 1969

3,479,247
RESINS PREPARED FROM AMINO COMPOUNDS, ALDEHYDES, POLYHYDROXYL COMPOUNDS AND MONOHYDRIC ALCOHOLS
Francis A. Bonzagni, Springfield, Mass., assignor to Monsanto Company, St. Louis, Mo., a corporation of Delaware
No Drawing. Filed May 23, 1966, Ser. No. 551,913
Int. Cl. B32b 27/42, 27/10
U.S. Cl. 161—263                                                7 Claims

ABSTRACT OF THE DISCLOSURE

Disclosed herein is a process for producing solution stable resins which comprises the steps of reacting together under alkaline conditions a resin forming amino compound and an aldehyde, the molar ratio of aldehyde to amino compound being at least 1:1, further reacting the resulting solution in the presence of a polyhydroxyl-containing compound under acid conditions with a monohydric alcohol and then adjusting the pH of the resulting solution to 8.5–10.5 This process produces resins which may be dissolved to form laminating syrups and to laminates prepared therefrom.

---

This invention relates to condensation resins which exhibit long-lasting stability in solution.

Condensates of resin forming amino compounds and aldehydes are extensively used today. Melamine-formaldehyde condensation products find particular use in the preparation of laminates. The poor solution stability of such condensation resins is widely recognized within the industry and many proposals have been made to improve the solution stability of such resins. For example, such resins have been modified with ureas, sulfonamides, alcohols, sugars and polyhydroxyl containing compounds in general. Although the solution stability of such resins has been improved to some degree by modifications as taught in the art, further improvement thereof is highly desirable.

Accordingly, typical objects of this invention are to provide improved: (1) solution stable condensation resins; (2) solutions, particularly aqueous solution, of condensation resins which exhibit long-lasting stability; (3) process for producing solution stable condensation resins; and (4) laminates prepared from condensation resins.

Other objects, aspects and advantages of this invention will become apparent upon further study of this disclosure and the appended claims.

In accordance with a basic aspect of this invention, a process is provided which broadly comprises a conventional alkaline addition reaction of a resin forming amino compound and an aldehyde followed by an acidic reaction of the resulting solution containing a polyhydroxyl containing compound with a monohydric alkanol. In another aspect, novel resinous co-condensation products are provided which comprises the alkyl ethers of a resin forming amino compound-aldehyde reaction product and of a polyhydroxyl containing compound. In still another aspect, long-lasting solutions of condensation resins are provided which comprises the novel resinous co-condensation products of this invention with water, water-alcohol mixtures, or the reaction mixture of the process of this invention. In a further aspect, laminates having improved gloss and postforming properties are provided by using solutions of the novel resinous co-condensation products of this invention as the impregnating laminating syrups.

In practicing the process of this invention, an initial reaction mixture is formed which contains an aldehyde and a resin forming amino compound in a desired molar ratio. The polyhydroxyl containing compound may be present in the initial mixture as it does not adversely affect the alkaline addition reaction. However, it may be added after the alkaline reaction. The monohydric alkanol will not generally be a part of the initial mixture because its presence therein causes a reaction between the aldehyde and alkanol which competes with the reaction between the amino compound and the aldehyde, thus adversely affecting the degree of addition obtainable.

The invention will now be described in more detail in the following examples which are set forth for illustration and are not to be construed as limitations upon the scope of the invention. Unless otherwise noted, where quantities are mentioned they are parts by weight.

EXAMPLE I

Mix together 150 parts of formaline (50–50 formaldehyde-water), 0.22 part of 45% KOH, 50 parts of sucrose, and 126 parts of melamine. Adjust the pH of the mixture to about 9.2 and heat the mixture to initiate the reaction. The heat of reaction causes the temperature to rise. Hold the mixture at about 90–95°C. with cooling, if necessary, for about 20 minutes or until the mixture is clear. Add 320 parts of methanol and 2.1 parts of oxalic acid to the clear solution. Adjust the pH of the solution to about 6–6.5 and continue the reaction at about 55° C. for about 75 minutes or until a water hydrophobe endpoint is reached. Then neutralize the solution to a pH of about 9.0 with 45% KOH and concentrate the solution to about 70% solids.

The resin solution produced by this example can be stored without precipitation or gelation of the resin for periods of time in excess of six months. Conventional melamine-formaldehyde resins are stable for only periods of time in the range of 4–10 weeks.

EXAMPLE II

Mix together 150 parts of formalin (50–50 formaldehyde-water), 0.22 parts of 45% KOH, 50 parts of sorbitol, and 126 parts of melamine. Adjust the pH of the mixture to about 9.0 and heat the mixture to initiate the reaction. The heat of reaction causes the temperature to rise. Hold the mixture at about 85–95°C. with cooling, if necessary, for about 20 minutes or until the mixture is clear. Add 320 parts of methanol and 2.1 parts of oxalic acid to the clear solution. Adjust the pH of the solution to about 6.0 and continue the reaction at about 55°C. for about 75 minutes or until a water hydrophobe endpoint is reached. Then neutralize the solution to a pH of about 9.0 with 45% KOH and concentrate the solution to about 70% solids.

The resin produced by this example is equivalent in storage stability to the resin obtained in Example I.

EXAMPLE III

Example I is repeated except that no polyhydroxyl containing compound is employed in any part thereof. The resin thus produced has only limited stability in solution, i.e. up to about 30 days.

EXAMPLE IV

Example II is repeated except that no monohydric alkanol is employed in any part thereof. The resin thus produced has only limited stability in solution, i.e. 8–12 weeks.

The process of this invention can be carried out within a wide range of operating variable. The molar ratio of aldehyde to amino compound employed in the initial mixture can vary from about 1:1 to about 15:1 and preferably about 2:1 to 8:1. A greater excess of aldehyde present will be limited only by practical operating standards. The molar ratio of polyhydroxyl compound to amino compound will range from about 1:8 to about 1:1 and preferably from about 1:4 to about 1:1.5. The molar ratio of monohydric alkanol to amino compound will range from about 6:1 to about 25:1 and preferably about 8:1 to about 15:1. Operating conditions for the pH and temperature variables can be summarized as follows:

| Process step | pH Range | | Temperature Range | |
|---|---|---|---|---|
| | Broad | Preferred | Broad, °C. | Preferred, °C. |
| Alkaline step | 7.6–10.5 | 8.5–9.5 | 70–105 | 85–95 |
| Acid step | 2.5–6.5 | 4.5–6.0 | 45–65 | 50–60 |

The resins of this invention are characterized by the etherification, at least partial etherification, of the alkaline reaction product and of the polyhydroxyl containing compound. The resins are condensed to the stage at which they have a water dilutability point of 25–60%. The water dilutability point is defined as the weight percent resin solids to which an aqueous resin solution can be diluted with water at 25° C. before incipient precipitation of the resin occurs. The resins of this invention can contain other materials such as fillers, pigments and other modifiers such as sulfonamides.

EXAMPLE V

Prepare a decorative laminate as follows: impregnate 7 substrate sheets of kraft paper with about 35% of a commercially available phenolformaldehyde resin and an alpha cellulose print sheet with about 40 weight percent of a conventional melamine-formaldehyde resin. Overlay one half of the panel with a 4 mil alpha cellulose sheet and the other half with a 4 mil viscous rayon paper both impregnated with about 65 weight percent of the resin obtained from Example I. Press the laminate for 20 minutes at 290° C. under a pressure of about 1000 pounds per square inch.

The transparency and gloss of both halves of the laminate prepared above is substantially the same and is better than that of similar laminates wherein the overlay sheet is impregnated with conventional melamine-formaldehyde resins. Also, similar improved results are obtained by using the resin obtained from Example II above in place of the Example I resin when preparing laminates.

Any resin forming amino compound can be employed in this invention. The aminotriazine compounds, such as melamine, substituted melamines, cycloaliphatic guanamines, and mixtures thereof are prepared for use in this invention. Suitable substituents for the melamine are 1–6 carbon atom, preferably 1–4 carbon atom, alkyl groups and 1–2 phenyl groups. Examples of such substituted melamines are monomethyl melamine, dimethyl melamine, trimethyl melamine, tetramethyl melamine, monoethyl melaine, 1-methyl-3-propyl-5-butyl melamine, monophenyl melamine, diphenyl melamine, and the like. Cycloaliphatic guanamines, in general, can be employed in this invention. Preferably, they will not contain more than 15 carbon atoms. Examples of suitable cycloaliphatic guanamines are tetrahydrobenzoguanamine, hexahydrobenzoguanamine, 3-methyl-tetrahydrobenzoguanamine, 3-methyl-hexahydrobenzoguanamine, 3,4 - dimethyl-1,2,5,6-tetrahydrobenzoguanamine, 3,4-dimethyl-hexahydrobenzoguanamine, and the like. A preferred cycloaliphatic guanamine is tetrahydrobenzoguanamine. Desirable mixtures of aminotriazine compounds are melamine and dimethyl melamine, melamine and tetrahydrobenzoguanamine, and the like. When employing a mixture of aminotriazine compounds as for example, melamine and tetrahydrobenzoguanamine, the mixture should consist of 95–5 weight percent of melamine and, correspondingly, 5–95 weight percent of tetrahydrobenzoguanamine. The same limits of the mixture would apply when using any mixture of the aminotriazine compounds. A preferred mixture is 75–95 weight percent of melamine and, correspondingly, 25–5 weight percent of tetrahydrobenzoguanamine.

Any aliphatic aldehyde which will condense with the resin forming amino compounds can be employed in this invention. Particularly useful are acetaldehyde, butyraldehyde, formaldehyde, crotonic aldehyde, acrolein, heterocyclic aldehydes such as alpha-chlorobutyraldehyde, and the like. The preferred aldehyde to be employed in the practice of this invention is formaldehyde and preferably aqueous formaldehyde such as 50% formalin, a 50–50 mixture of formaldehyde and water.

Urea or thiourea may be included in the resins of this invention in amounts of up to about 2.5 parts per 97.5 parts of an aminotriazine compound. The presence of this quantity of thiourea accelerates the cure rate of the resin and also increases the gloss of laminates prepared therefrom. In addition, the presence of thiourea in the resin permits decorative laminates having overlay sheets impregnated therewith to be removed from the press hot with little or no loss of gloss. In another embodiment of the invention, comparable results are obtained by admixing thiourea with a solution of a resin of this invention in amounts of up to about 2.5 parts per 97.5 parts of melamine contained in the resin.

The polyhydroxyl-containing compounds applicable to this invention include sucrose, ethylene glycol, disaccharide, dextrin, corn syrup, starch hydrolyzate, glycerin, benzyl alcohol, sorbitol, diethylene glycol, and the like. The preferred polyhydroxyl containing compounds are sucrose and sorbitol. Optimum solution stability is attained when the resins contain about 15–50 weight percent of the polyhydroxyl-containing compound and optimum post-formability is attained when the resins contain 20 or more weight percent thereof. An optimum balance of properties of transparency, solution stability and post-formability is attained when the resins contain about 15–25 weight percent of the polyhydroxyl-containing compound.

Monohydric alkanols suitable for use in etherifying the amino compound and aldehyde reaction products and the polyhydroxyl containing compound in this invention are aliphatic and alicyclic alcohols containing 1–6 carbon atoms. Methanol is the alkanol preferred for use in this invention.

The preparation of laminates employing the resins of this invention generally follows procedures which are well known in the art and therefore will not be repeated here in detail. The material to be laminated will be impregnated with 30–80 weight percent of the resin of this invention and dried to a volatile content of the order of 3–10 percent. The impregnating resins of this invention may contain any of the art recognized curing catalysts such as set forth in U.S. Patent 3,194,723. The assembly of resin-impregnated sheets is subjected to a pressure of the order of 100–2000 pounds per square inch and heated for 5–60 minutes at a temperature of 200–400° F.

The resinous condensation products of this invention can also be used in such other applications as the bonding of fibers to form fibrous structures which are used as oil filters, water filters, air filters, thermal insulation, molded furniture parts, orthopedic resins, the bonding of wood veneer to form laminate plywood structures and for high density molded objects which may or may not employ powdered mica, asbestos, cellulosic fibers such as bleached alpha-cellulose flock, unbleached alpha-cellulose flock and may include pigments, fillers and modifiers.

It will thus be seen that the objects set forth above, among those made apparent from the description, are efficiently attained. It will be apparent that changes may be made in carrying out the above defined process and in the composition set forth without departing from the scope of this invention. Thus, it is intended that all matters contained in the above description shall be interpreted as illustrative and not in a limiting sense.

What is claimed is:
1. A process for producing solution stable resins which comprises forming a reaction mixture containing an aliphatic aldehyde and an aminotriazine in a molecular proportion of at least 1:1, adjusting the pH value of the reaction mixture to between about 7.5–10.5; heating the reaction mixture to a temperature between about 70–110° C. until the solution is clear; adjusting the pH value of the solution to between about 2.5–6.5 in the presence of 1 molar proportion of a polyhydroxyl containing compound selected from the group consisting of aliphatic polyhydric alcohols, carbohydrates and benzyl alcohol per from 1 to 8 molar proportions of aminotriazine employed in said reaction mixture; heating the solution to a temperature between about 45–65° C. in the presence of a monohydric alkanol until a water hydrophobe endpoint is reached; and adjusting the pH of the resulting solution to a pH between about 8.5–10.5.

2. The process of claim 1 wherein melamine and formaldehyde in a molar ratio of from 1:1 to 1:15 are reacted together at a pH between about 8.5–9.5 and at a temperature between about 85–100° C. until a clear solution is obtained; adjusting the pH of the solution to between about 4.5–6.0 in the presence of 1 molar proportion of sucrose per 8–15 molar proportions of melamine employed in said reaction mixture; heating the solution to a temperature between about 50–60° C. in the presence of methanol until a water hydrophobe endpoint is reached; and neutralizing the resulting solution to a pH between about 8.5–9.5.

3. The process of claim 1 wherein a reaction mixture of melamine, 50% formalin and sucrose is formed containing 2–8 molar proportions of formaldehyde and 0.15–0.75 molar proportions of sucrose per molar proportion of melamine; the mixture is adjusted to a pH of 8.5–9.5 and heated at a temperature from 85–100° C. until the solution clears; the solution is adjusted to a pH of 4.5–6.0 and 8–15 molar proportions of methanol per molar proportion of melamine employed in the reaction mixture is added thereto; the resulting solution is heated at a temperature from 50–60° C. until a water hydrophobe is reached; and the solution is adjusted to a pH of 8.5–9.5.

4. A laminating syrup that is stable for an extended period of time comprising 40–60 weight percent of a resin of claim 1 in solution with 60–40 weight percent of a solvent selected from the group consisting of water and mixtures of a major amount of water and a minor amount of 1–4 carbon atom alcohols.

5. A laminating syrup of claim 4 wherein the resin of claim 1 is a melamine-formaldehyde-sucrose-methanol condensate.

6. A laminate comprising a sheeted inert filler bonded with a resin of claim 1.

7. The laminate of claim 6 wherein the filler consists of a thermoset resin bonded assembly of a rigid substrate, a decorative print sheet impregnated with a melamine-formaldehyde resin, and an overlay sheet impregnated with a resin of claim 1.

References Cited

UNITED STATES PATENTS

| | | | |
|---|---|---|---|
| 2,197,357 | 4/1940 | Widmer et al. | 260—17.3 |
| 3,194,720 | 7/1965 | Grudus et al. | 260—17.3 |

FOREIGN PATENTS

| | | |
|---|---|---|
| 105,490 | 10/1938 | Australia. |
| 1,056,216 | 1/1967 | Great Britain. |

HAROLD D. ANDERSON, Primary Examiner

E. WOODBERRY, Assistant Examiner

U.S. Cl. X.R.

260—17.3, 67.6